S. H. WILLS.
COTTON CHOPPER.
APPLICATION FILED FEB. 14, 1916.
1,210,579.
Patented Jan. 2, 1917.
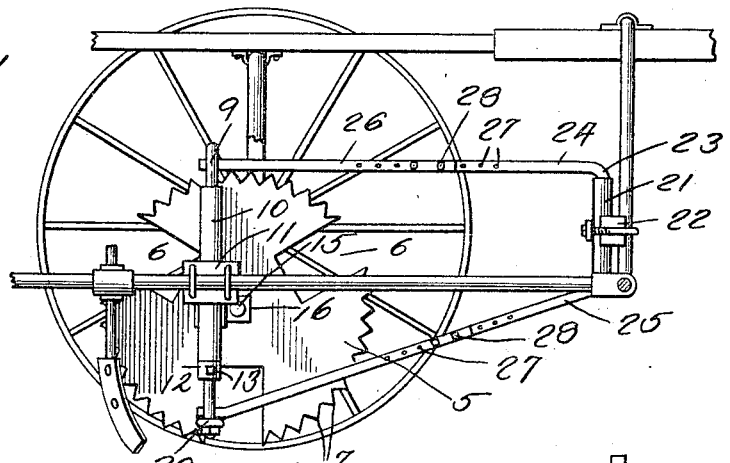
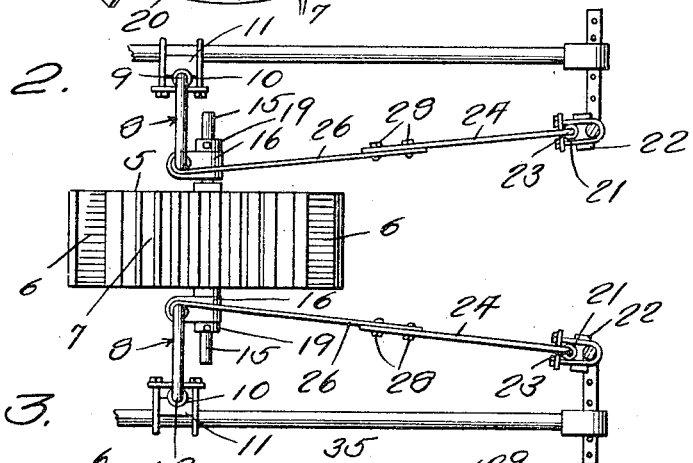
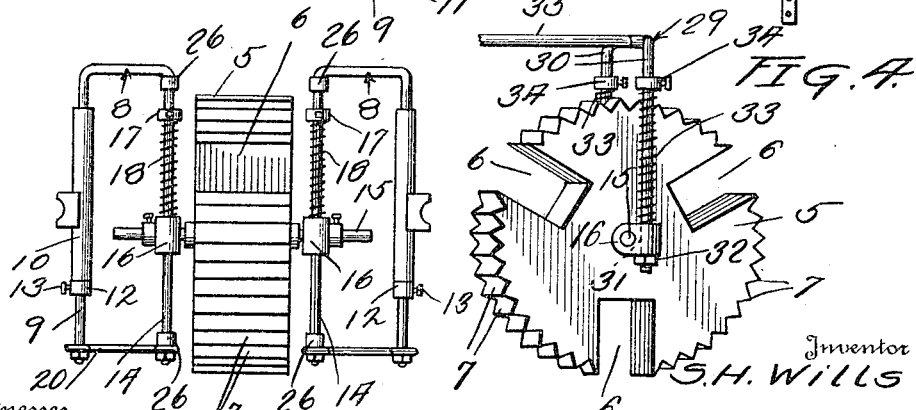
Inventor
S. H. Wills

UNITED STATES PATENT OFFICE.

SALADIN H. WILLS, OF NEWLIN, TEXAS.

COTTON-CHOPPER.

1,210,579.  Specification of Letters Patent. Patented Jan. 2, 1917.

Application filed February 14, 1916. Serial No. 78,205.

*To all whom it may concern:*

Be it known that I, SALADIN H. WILLS, a citizen of the United States, residing at Newlin, in the county of Hall, State of Texas, have invented certain new and useful Improvements in Cotton-Choppers; and I do hereby declare the following to be a full, clear, and exact description of the invention, such as will enable others skilled in the art to which it appertains to make and use the same.

This invention relates to agricultural machinery and particularly to cultivating implements.

The primary object of the invention is to provide means adapted for use in connection with a cultivator whereby certain of the plants in a row may be destroyed, and whereby the destroyed plants may be utilized to enrich or fertilize the soil.

A further object of the invention is to provide a device of the class described wherein certain of the plants are destroyed, and other plants are undisturbed or left standing at regular spaced intervals.

A still further object of the invention is to provide an attachment for cultivators capable of performing the above mentioned functions, which is adapted particularly to be attached to a cultivator in advance of the plows thereof, and which is capable of adjustment toward or away from the plows.

A still further object of the invention is to provide a device of the class described which is comparatively simple and inexpensive of construction, which may be with facility applied to various types of cultivators, which is positive in operation, which is capable of various minute adjustments, and which will prove thoroughly efficient for the purposes for which it is designed.

With these objects in view together with others which will appear as the description proceeds, the invention resides in the novel combination and arrangement of parts all as will hereinafter be more fully described, illustrated in the accompanying drawings, and particularly pointed out in the claims.

The invention will be best understood by reference to the accompanying drawings, wherein:

Figure 1 is a vertical section taken through a portion of a conventional form of land cultivator, and illustrating in side elevation the application of a device constructed in accordance with my invention, Fig. 2 is a top plan view of the device shown in Fig. 1, Fig. 3 is a rear end view of the device, and Fig. 4 is a detail end view of a slightly modified form of the device.

The invention is designed particularly for use in connection with cultivators or other implements of a similar nature employed in the cultivation of cotton. The invention resides in arranging a masher roller between the plows of the implement and slightly in advance thereof, so as to travel over the row of young plants, mashing or destroying certain of the plants, and leaving certain other plants at spaced intervals standing and untouched. By arranging the masher roller in the position above specifically referred to, the plows following will cover the mashed or destroyed plants, and the decomposition of these plants beneath the soil will serve to enrich the same to fertilize the remaining plants.

Referring now more particularly to the drawings, 5 indicates the masher roller employed in carrying out the invention. This roller is preferably formed of cast metal, and is of sufficient weight to completely crush and destroy the plant over which it passes. The roller also is of sufficient width or thickness as to completely crush the plants in a row. Arranged to extend inwardly from the periphery of the roller, and preferably at regular spaced intervals, are notched portions 6. These notches may extend inwardly a distance sufficient to permit of the accommodation of young growing plants, and it is apparent that when the roller is moved over a row of growing plants, those which happen to lie in such position as to be inclosed by the notched portions of the roller in its rotation will remain standing, while those contacted by the periphery of the roller will be mashed or crushed. To insure complete destruction of the plants contacted by the roller periphery, teeth 7 are arranged in the said periphery, and it is evident that these teeth will act to chop, or cut the intervening plants to efficiently mangle the same before being covered by the following plows or cultivator implement. It is also apparent that the pressure exerted by the roller 5 will firmly pack the soil surrounding each of the plants left standing, thereby firmly embedding the said plants.

As an efficient means for securing the above described masher roller in proper position upon a cultivator implement, frames 8 are provided. The frames may be U-shaped as shown, and one is arranged adjacent the opposite sides of the roller. One leg 9 of each of the frames extends through a sleeve 10 rigidly secured as at 11 to any fixed portion of the cultivator frame, whereby the U-frame is supported perpendicularly to the ground and hinged to the frame of the implement. A collar 12 provided with a set screw 13 is arranged upon the leg 9 of each of the U-frames in order that the said frame may be adjusted toward and away from the ground. The opposite leg 14 of each U-frame extends adjacent the spindles 15 projecting laterally from each side of the roller 5, and extends loosely through an opening formed in a boxing 16 arranged upon the said projecting ends of the shaft. An adjustable collar 17 is mounted upon each of the legs 14 of the frame adjacent the bight portion thereof, and a coil spring 18 is interposed between the said collar and the boxing 16. Adjustable nuts 19 are secured upon the shaft ends to securely hold the boxing 16 against movement longitudinally of the shaft.

It is apparent from the construction so far described, that the roller is supported between the opposite frames 8, and the hinge arrangement of the latter through the sleeve 10 permits of various oscillations of the roller incident to travel over rough ground. It is also evident that the roller is capable of vertical movement also to enable the same to easily ride over irregular surfaces. In addition to the weight of the roller or wheel 5, the springs 18 operate to exert downward pressure upon the roller to enable the latter to firmly engage and press upon the ground. The ends of the legs 9 and 14 of the U-shaped frames may be connected by bars 20.

Secured preferably to the rear side of the front arch of the cultivator, and preferably spaced equidistant thereon beyond the central line of the masher wheel or roller 5, are vertically disposed sleeves 21. The sleeves may be secured to the said arch by means of strap members 22. A bar 23 is mounted for rotary movement within each of the sleeves 21, and is arranged to provide rearwardly extending upper and lower arms 24 and 25 respectively. Links 26 connect the upper and lower portions of each of the legs 14 of the U-frames with the arms 24 and 25 upon their respective sides of the roller or wheel 5. The adjacent ends of the arms 24 and 25 and the links 26 may be provided with spaced apertures 27, through which adjusting bolts 28 may be inserted. Thus it will be seen that the U-frames may be swung upon their pivotal supports 10 to enable the roller or wheel 5 to be adjusted forwardly or rearwardly of the cultivator frame, adjacent or away from the plows. The pivotal connections of the arms 24, 25, and the outermost legs 9 of the U-frames, permit of various slight oscillations of the masher wheel, in order that the same may conform readily to irregularities in the surface of the ground.

In Fig. 4 of the drawings, I have illustrated a slightly modified form of the device, in which the wheel or roller 5 is suitably attached to the cultivator by means of a single U-frame 29. This frame provides downwardly projecting legs 30, which are seated within vertically disposed openings 31 in the boxings 16 upon the projecting ends of the shaft 15. Nuts 32 may be threaded upon the extremities of the arms 30 to prevent disengagement of the said arms from the boxings. Coil springs 33 encircle the legs 30 of the U-frame, and bear at their opposite ends against the boxings 16 and the adjustable collars 34 secured upon the said legs. A connecting bar 35 may be employed to secure the U-shape frame 29 to a fixed portion of the cultivator.

In practice, the masher wheel or roller 5 is arranged in the above described manner upon the cultivator frame slightly in advance of the plows thereof. As the cultivator is driven with the masher roller 5 traveling over the row of plants, certain of the plants will, by reason of the notched portions 6, be left standing, while the intervening plants, or those contacted by the periphery of the wheel will be mashed and chopped by reason of the teeth 7 in the periphery of the said wheel. As the cultivator advances, the following plows turn the soil upon the opposite sides of the row upon the mashed or chopped plants, and also adjacent the base portions of the stems of the upstanding plants. By reason of the chopping or mutilation of certain of the plants, and covering thereof by the following plows, the same will decompose beneath the surface of the soil, and such decomposition acts to fertilize or enrich the soil for the benefit of the remaining live plants.

While the present disclosure illustrates and describes a particular embodiment of my invention, I am aware that the device is susceptible to various changes in the minor details of construction and arrangement of parts and I reserve to myself the right to make such alterations as I may deem desirable without departing from the spirit of the invention.

I claim:

1. In a device of the class described, a masher wheel, a shaft projecting beyond the ends of said wheel, a boxing on each of said shaft ends, each of said boxings being provided with an angularly disposed opening, a frame, legs on the said frame extending through said openings, collars on said legs, springs interposed between said collars and said boxings, and means for attaching said frame to a cultivator, substantially as described.

2. In a device of the class described, a masher wheel, a shaft extending beyond the lateral ends of said wheel, and a boxing on each of said projecting ends, a U-frame adjacent each side of said wheel having one leg pivotally secured to a cultivator frame and its opposite leg loosely extending through said boxings, springs on said latter mentioned legs for exerting pressure upon said boxings, a bar secured to said cultivator frame in advance of said wheel and providing rearwardly extending arms, links connecting said frames at their upper and lower ends with said arms, and means for adjusting said links with relation to said arms, substantially as described.

3. In a device of the class described, the combination with a cultivator, of a masher wheel, a shaft extending beyond the lateral ends of the wheel, a boxing on each of said projecting ends, a U-frame adjacent each side of said wheel having one leg pivotally secured to the cultivator and its opposite leg loosely extending through the adjacent boxing, springs on the last mentioned legs for exerting pressure upon said boxing, links connecting said U-frame with the cultivator frame in advance of the said masher wheel, and means for extending or contracting the length of said links, substantially as described.

In testimony whereof, I affix my signature, in the presence of two witnesses.

SALADIN H. WILLS.

Witnesses:
N. E. BURK,
A. S. MOSS.

Copies of this patent may be obtained for five cents each, by addressing the "Commissioner of Patents, Washington, D. C."